Feb. 24, 1931.  W. E. WINE ET AL  1,793,985
TRACTION WHEEL
Filed April 8, 1925  2 Sheets-Sheet 1
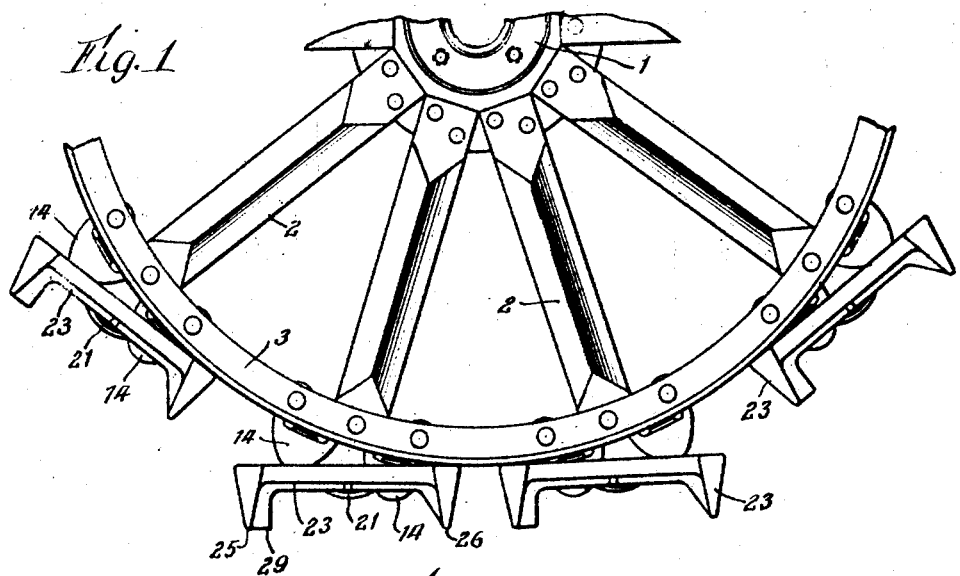
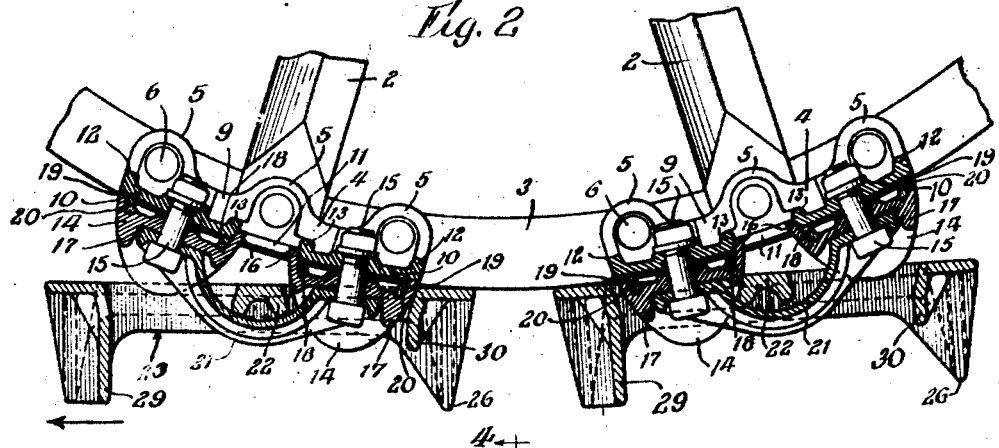
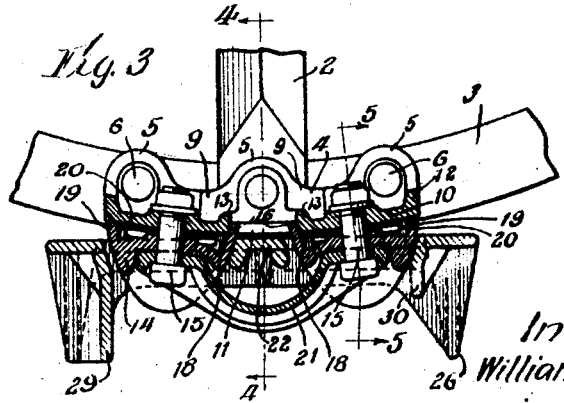
Inventors:
William E. Wine
Joseph W. Promenschenkel
By: Wm. O. Belty
Atty.

Feb. 24, 1931.                W. E. WINE ET AL                1,793,985
                                TRACTION WHEEL
                    Filed April 8, 1925        2 Sheets-Sheet 2
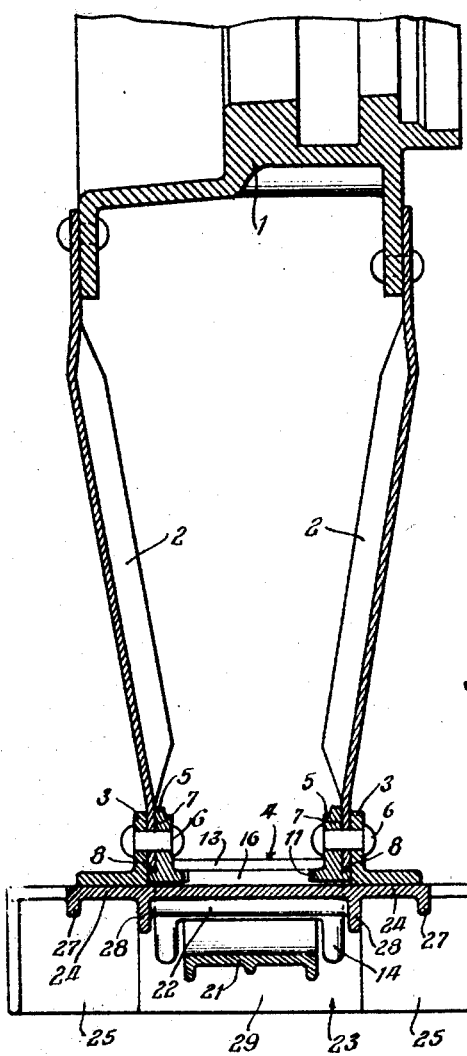
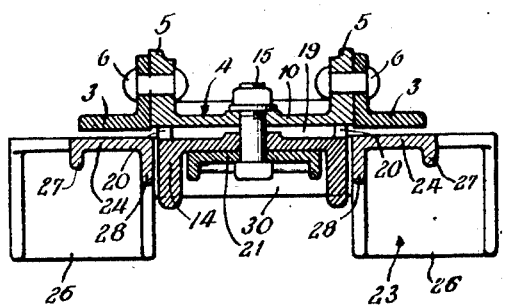
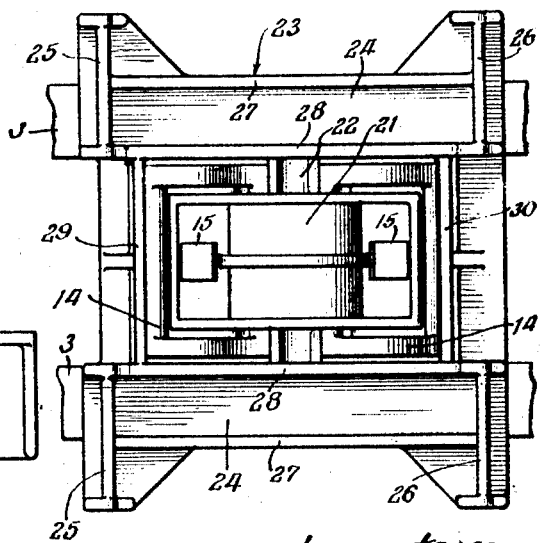
Inventors:
William E. Wine
Joseph W. Promenschenkel.
By: Wm. O. Bell, atty.

Patented Feb. 24, 1931

1,793,985

UNITED STATES PATENT OFFICE

WILLIAM E. WINE AND JOSEPH W. PROMENSCHENKEL, OF TOLEDO, OHIO, ASSIGNORS TO THE WINE RAILWAY APPLIANCE COMPANY, OF TOLEDO, OHIO, A CORPORATION OF OHIO

TRACTION WHEEL

Application filed April 8, 1925. Serial No. 21,730.

The subject matter of the application was disclosed in the sole application Serial No. 10,722 filed February 21, 1925, by the undersigned William E. Wine for the same invention.

This invention relates to a novel and improved traction wheel of the type in which a plurality of traction shoes are mounted upon the rim of the wheel and are engaged with teeth secured to the rim for the purpose of obtaining the desired traction. These teeth are fastened to the rim by various means such as bolts and it is one of the principal objects of our invention to provide means for relieving the bolt or other fastening means of the shear which it otherwise has to bear.

A further object of the invention is to provide a traction wheel having a rim which will not readily accumulate dirt, which may be used either with or without traction shoes, and in which one member may be used as a spacer to support the teeth and to secure the rim to the spokes.

A still further object of the invention is to provide novel and improved means for joining the spokes of a wheel to the rim thereof in such manner as to decrease the strain upon the connecting means without impairing the efficiency of the wheel.

Another object of the invention is to provide a traction shoe of novel and improved form which will prevent disturbance of the earth over which the wheel passes, thereby permitting the shoes to be placed closer together and resulting in a smoother rolling action of the wheel on the shoes.

Still another object is to provide a shoe having ground engaging members which shall be of increased strength over the types now in general use.

Yet another object of our invention is to provide a novel and improved tooth for attachment to a rim of a wheel and which shall be so proportioned to the other parts of the wheel as to co-operate therewith to the best advantage and without certain disadvantages which have been present in structures of this type in the past.

In the accompanying drawings in which we have shown a selected embodiment of the invention—

Fig. 1 is a view in elevation of a portion of a traction wheel embodying the invention.

Fig. 2 is a vertical section of a portion of the wheel shown in Fig. 1 but on an enlarged scale, said section being taken normal to the axis of the wheel.

Fig. 3 is a section on the same plane as that of Fig. 2, but showing a shoe in a different position relative to the rim.

Fig. 4 is a section on the line 4—4 of Fig. 3, but including a portion of the hub.

Fig. 5 is a section on the line 5—5 of Fig. 3.

Fig. 6 is an outer plan view of the structure shown in Fig. 3.

Referring to the drawings, the numeral 1 designates a hub of any suitable construction having secured thereto the spokes 2. The rim of the wheel comprises spaced rings 3, preferably formed of angle bars bent to the desired form. These rings are held apart the desired distance by a plurality of spacer members 4 disposed about the periphery of the wheel. Each spacer member is provided with a plurality of ears 5 extending radially of the wheel and apertured to receive fastening means, such as rivets 6 for securing the spacers to the rings. It will be noted that these spacers are received entirely within the periphery of the wheel so that the wheel may, if desired, be used without teeth or traction shoes on hard roads.

Each of the spacer members is disposed at the end of a spoke, so that the means which is employed to hold the spoke to the rim may also be employed to hold the spacer member to the rings comprising the rim. Referring particularly to Fig. 4, it will be seen that the spokes are preferably arranged in pairs, the spokes of each pair being arranged opposite to each other and the ends thereof being received in recesses 7 within the central ears 5 of the spacer members. The extreme ends of the spokes contact with the bottoms 8 of the recesses, as plainly shown in Fig. 4. It will thus be evident that the rivets 6, which pass through the central ears 5 of the spacer members, not only aid in securing the spacer members to the rim, but also effectively secure the spokes in position. By placing the end of a spoke between a ring 3 and an ear 5, and then fastening it by a rivet, it is obvious that the rivet is placed in double shear thereby materially increasing the efficiency thereof. Furthermore, by providing the recesses in the ears 5 and having the ends of the spokes engaging the bottoms of these recesses, it is obvious that even that shear is taken away from the rivets. In fact, these rivets could, if desired, be omitted so far as their necessity for transmitting any stress to the spokes is concerned.

The ears 5 are connected by flanges 9 contacting with the inside of the rings 3, these flanges effectually bracing the ears. Connecting the ears and flanges is a transverse web 10 centrally apertured at 11. This web is provided with transverse ribs 12 and 13, at its ends and along the transverse edges of the central aperture 11 respectively which form additional strengthening means.

Secured to each spacing member is a pair of teeth 14, these teeth preferably being secured to the spacer members by bolts, or the like 15, so that they may be readily removed, if desired. Each tooth is provided with a lip 16 received within the central aperture 11 of the spacer member and is further provided with an abutment lug 17 on the side adjacent one end of the spacer member for a purpose which will presently appear.

Referring particularly to Fig. 5, it will be seen that each tooth 14 is narrower than the spacer member 4. In wheels now in general use such teeth have been made of a width to rest upon the rings 3. Due to inaccuracy of work, it has often happened that the teeth would not rest smoothly against the rings forming the rim and therefore they were easily broken. This result is obviated by our construction in that the tooth is independent of the rim, and is required to be made to fit only one surface of one member, namely the spacer member, instead of having to be made to fit a spacer member and two rings. Contact between the spacer member 4 and each tooth 14 is had by engagement of the shoulders 18 disposed immediately back of the lip 16, by the transverse flanges 19 at the other end of the tooth and by the shoulders 20 immediately back of the flanges 19. The remainder of the tooth is spaced from the spacer member. By this means it is obvious that any dirt which may get between the tooth and the spacer member will do no damage, but will soon be displaced.

Joining the teeth and held in place by the same bolts which secure the teeth to the spacer member, is a holder 21 which engages the transverse bar 22 on the traction shoe 23 to hold it in co-operative relation to the teeth. This holder is made of right construction to form a bridge, and its ends contact with the lugs 17 which act as abutments to aid in taking the shear from the bolts 15. By this means the teeth are firmly connected together to act in unison, and as shear is transmitted to one of the teeth due to the tractive effort, the same shear is also transmitted to the other tooth. Referring to Fig. 2 for example and assuming the the wheel is moving in the direction indicated by the arrow, it will be evident that the shear taken by the tooth at the right end of the spacer member is transmitted to the bolt holding that tooth in position. The shear is further transmitted by the holder 21 to the other tooth and is resisted by its bolt and by the lip 16 thereon contacting with the edge of the aperture 11. Similarly, when the wheel is rotating in the other direction the lip 16 on the tooth at the right end of the spacer member will aid in taking the shear from the two bolts which hold the teeth in position. Not only does the central aperture 11 provide means to receive the lips 16 and thus transmit shear to the spacer member, but it also provides a passage for dirt, to prevent its accumulation between the rim and the shoe where it would clog and hamper the operation of the teeth and shoe.

Our novel and improved traction shoe 23 comprises a pair of track sections 24 which extend lengthwise of the shoe and in a position to support the rings 3. The shoe is further provided with a plurality of transverse ground engaging bars 25 and 26, adjacent the four corners of the shoe. These bars are substantially parallel to each other and are connected by longitudinal strengthening ribs 27 and 28. The ribs 27 tie together the bars 25 and 26 in an effective manner to brace the same. The same function is achieved by the ribs 28, these ribs also tying the bars 25 to the transverse ground engaging bar 29 which, as plainly shown in Fig. 6, is offset from the line of the bars 25. A rib 30 is disposed between the ribs 28 and in a position corresponding to the position of the bar 29, but, as best shown in Figs. 2 and 3, this rib does not extend to the same depth as the bar 29.

By this construction it will be seen that the bars 25 and 29 are much stronger than if they were made in the form of one bar extending entirely across the shoe. Moreover, as best shown in Fig. 2, there is a substantial distance between the bars 29 on adjacent shoes. This means that the column of dirt between the cross bars is a relatively long one and therefore is not so apt to be disturbed by engagement of the bars and application of force through the bars, as would be the case if the column were relatively short as where the ground engaging bars on the same or adjoining shoes are close together. By this arrangement we make it possible to bring the shoes nearer together on the periphery of the rim so as to furnish a more nearly continuous track. It will be noted that the width of the bar 29, and therefore of the column of dirt on which this bar acts, is substantially the same as the width of the rim and is relatively great so that disturbance of the dirt is minimized and firm engagement with the ground is insured. The ground engaging bars 25 and 26 co-operate with the bar 29 to further insure against disturbance of the dirt and to give a firm grip of the shoe with the ground.

The transverse bar 22 and the inner faces of the ground engaging bar 29 and the rib 30 are formed to co-operate with the surfaces of the teeth 14, as is well known in the art.

We are aware that changes in the form, construction and arrangement of parts may be made without departing from the spirit and without sacrificing the advantages of the invention and we reserve the right to make all such changes as fairly fall within the scope of the following claims.

We claim:

1. A traction wheel comprising a rim, said rim being formed of spaced rings, spacer members between said rings, teeth secured to said spacer members, a shoe adapted to co-operate with said teeth and provided with a transverse bar, and means on said rim loosely engaging said bar and securing said shoe to the rim.

2. A traction wheel comprising a rim formed of spaced rings, a plurality of spacer members between said rings, a pair of teeth on each of said spacer members and each having a lip received within an aperture therein, and means connecting said teeth to cause them to act in unison and to transmit shearing stress from one to the other.

3. A traction wheel comprising a rim, a plurality of pairs of teeth thereon, means to secure each tooth to said rim, means on each tooth co-acting with said rim to relieve said securing means of shearing stress, and means connecting said teeth to distribute the shearing stress therebetween.

4. A traction wheel comprising a rim composed of spaced rings, a plurality of spacer members between said rings and secured thereto, each of said members being provided with a central aperture, and a tooth disposed on either side of said aperture peripherally of said rim, each tooth having a lip engaged with the edge of said aperture.

5. A traction wheel comprising a rim composed of spaced rings, a plurality of spacer members between said rings and secured thereto, each of said members being provided with a central aperture, a tooth disposed on either side of said aperture peripherally of said rim, each tooth having a lip engaged with the edge of said aperture, and means connecting said teeth to distribute shear from one to the other.

6. A traction wheel comprising a rim composed of spaced rings, a plurality of spacer members between said rings and secured thereto, each of said members being provided with a central aperture, a tooth disposed on either side of said aperture peripherally of said rim, each tooth having a lip engaged with the edge of said aperture, a bolt securing each tooth to said member, and a bridge member having its ends secured in place by said bolts and connecting said teeth.

7. A traction wheel comprising a rim composed of spaced rings, a plurality of spacer members between said rings and secured thereto, each of said members being provided with a central aperture, a tooth disposed on either side of said aperture peripherally of said rim, each tooth having a lip engaged with the edge of said aperture, a bolt securing each tooth to said member, a bridge member having its ends secured in place by said bolts and connecting said teeth, and abutments on said teeth engaging the ends of said bridge member.

8. A traction wheel comprising a rim, a plurality of pairs of teeth secured to said rim, a bridge member connected to each pair of said teeth to distribute shear therebetween, and abutments on said teeth engaging the ends of said bridge member.

9. A traction wheel comprising a rim formed of spaced rings, a plurality of spacer members between said rings and secured thereto, each of said members having a central aperture, teeth secured to said member on either side of said aperture peripherally of the rim, a holder connecting said teeth, and a shoe having a transverse bar co-operating with said holder to secure said shoe to said rim.

10. A traction wheel comprising a rim formed of spaced rings, a plurality of spacer members between said rings and secured thereto, each of said members being provided with an aperture, teeth on either side of said aperture peripherally of said rim, each tooth having a lip engaging the edge of said aperture, a shoe having a central transverse bar, and a holder secured to said rim and engaging said transverse bar to secure said shoe to said rim.

WILLIAM E. WINE
JOSEPH W. PROMENSCHENKEL.